Nov. 11, 1952    J. L. WOLFF, JR., ET AL    2,617,973
REGULATING SYSTEM
Filed Aug. 12, 1950

WITNESSES:
H. F. Susser
Wu. W. Groom

INVENTORS
John L. Wolff, Jr. &
Donald F. Aldrich.
BY
James W. Ely
ATTORNEY

Patented Nov. 11, 1952

2,617,973

UNITED STATES PATENT OFFICE 2,617,973

REGULATING SYSTEM

John L. Wolff, Jr., Greensburg, and Donald F. Aldrich, Pittsburgh, Pa., assignors, by mesne assignments, to the United States of America as represented by the United States Atomic Energy Commission Application August 12, 1950, Serial No. 179,074

6 Claims. (Cl. 321—25)

This invention relates to regulating systems and in particular to static regulating systems.

In many cases it is desirable to provide a regulated power supply which will maintain a substantially constant direct-current voltage; that is, one having a regulation under line voltage changes and load current changes of 1% or less. Heretofore different electronic systems have been developed which will maintain such a regulated electrical quantity but they are subject to a number of disadvantages. For example, vacuum tubes have a limited filament life and it is difficult to obtain them in sizes which will withstand the necessary direct-current voltage. Further, if the current to be drawn from the supply is of the order of one ampere, the number or size of the output tubes becomes prohibitive.

An object of this invention is to provide a regulating system of the static type utilizing a static amplifier.

Another object of this invention is to provide a relatively quick responsive static regulator sensitive to changes in an electrical quantity and provided with load compensation.

A further object of this invention is to provide a regulating system of the static type utilizing a static amplifier having a pair of oppositely disposed parallel-connected control windings therefor, the pair of control windings having impedance means connected in circuit therewith for cooperating with the windings to directionally control the net effective ampere turns of the pair of control windings depending upon the change of the electrical quantity from a predetermined value which is to be maintained.

Other objects of this invention will become apparent from the following description when taken in conjunction with the accompanying drawing in which.

Figure 1:
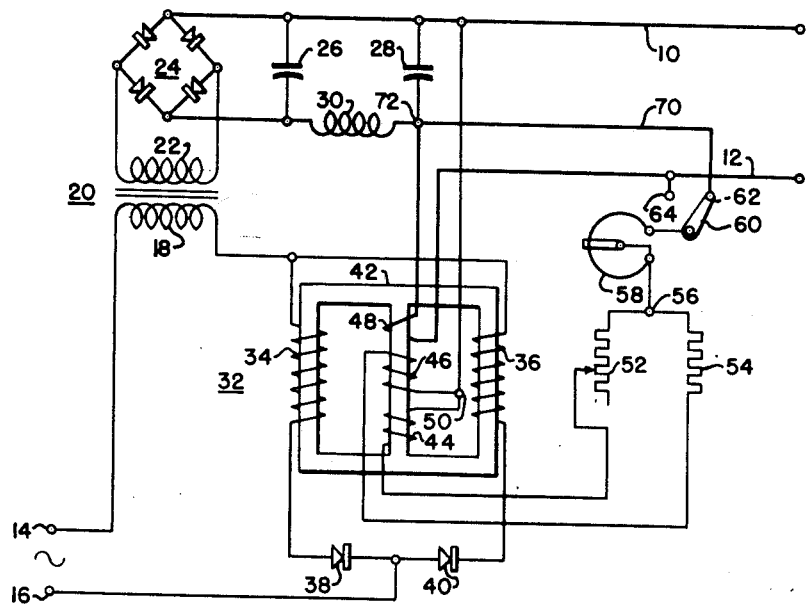
Figure 1 is a diagrammatic view of apparatus and circuits embodying the teachings of this invention.

Referring to Fig. 1 of the drawing, this invention is illustrated by reference to a regulating system for maintaining a substantially constant direct-current voltage across load conductors 10 and 12 which is supplied from an alternating-current source represented at the input terminals 14 and 16. As illustrated the primary winding 18 of a potential transformer 20 is connected to be supplied from the alternating-current source 14 and 16, the secondary winding 22 of the transformer being connected to the input terminals of a full-wave dry-type rectifier 24. The output terminals of the rectifier 24 are connected through a suitable filter circuit consisting of the capacitors 26 and 28, and an inductance coil 30 to the output or load conductors 10 and 12.

In accordance with this invention, a self-saturating reactor or magnetic amplifier 32 is disposed with the parallel-connected alternating-current or reactor windings 34 and 36 thereof connected in series circuit between the input terminal 16 of the alternating-current source and one of the terminals of the primary winding 18 of the potential transformer 20. In this instance, rectifiers 38 and 40 are connected in series circuit with the windings 34 and 36, respectively, but are connected oppositely so that the windings 34 and 36 are selectively energized by the flow of current therein in opposite half cycles of the input supply voltage only.

The magnetic amplifier 32 is illustrated as comprising a three-legged core member 42, the alternating-current windings 34 and 36 being disposed on the two external legs thereof. In order to control the voltage impressed on the load circuit 10—12, a plurality of direct-current control windings 44, 46 and 48 are disposed on the central leg of the core member 42 to thereby control the flux in the core member.

The control windings 44 and 46 are substantially identical in function but are disposed oppositely on the central leg of the core member 42 whereby their ampere turns are of opposite sense. As illustrated, the windings 44 and 46 are connected in parallel circuit relation with one another, the fixed terminal 50 therebetween being connected to the load conductor 10. The other ends of the windings 44 and 46 are connected through impedance means 52 and 54, respectively, to a common terminal 56, and from thence through an adjustable potentiometer resistor 58, positional switch 60 and one or the other of fixed contact members 62 and 64 to the load conductor 12. The purpose of the switch 60 and the selective connection thereof to the fixed contact members 62 and 64 will be explained more fully hereinafter, although it is to be understood that, preferably, the switch 60 is actuated to a given position prior to energizing the system.

In accordance with this invention, the impedance means 52 is one having a linear impedance characteristic and the impedance means 54 is a non-linear impedance, the impedances being connected in the parallel circuits of the windings 44 and 46, respectively, to be simultaneously energized in accordance with the voltage across conductors 10 and 12. The non-linear impedance means 54, for example, a Thyrite resistor and the linear impedance means 52, preferably a resistor, have intersecting characteristics and cooperate with the windings 46 and 44, respectively, to provide intersecting ampere turn characteristics for the windings 46 and 44, as illustrated by curves 66 and 68, respectively, of Fig. 2. Thus with an increase in voltage from a predetermined value across load conductors 10 and 12, the non-linear impedance 54 draws more current than the linear impedance 52, and as the voltage across conductors 10 and 12 decreases from the predetermined value, the linear impedance 52 draws more current than the non-linear impedance 54.

For a fixed voltage across conductors 10 and 12, the intersecting point of the curves 66 and 68 may be adjusted for any given or predetermined value of voltage between the common terminal 56 and conductor 10 by suitably adjusting the potentiometer resistor 52.

Thus by initially adjusting the potentiometer resistor 58, determining the voltage across conductors 10 and 12 which is to be maintained, the impedance means 52 and 54 will draw currents such that the opposed ampere turns of the control windings 44 and 46 will have a zero net effect on the magnetization of the core member 42. It will be appreciated that the change in current flowing in the non-linear resistance 54 is large percentage wise with respect to any change in the current flowing in the resistor 52, but in magnitude is quite small compared to the static current of the potentiometer resistor 58 whereby the change in the current flowing in the control windings and associated impedances has a negligible effect on the voltage drop across the potentiometer resistor 58. In effect, such action causes the control winding 44 to function as a reference source and the control winding 46 to function as a regulating source. However, as the voltage across conductors 10 and 12 changes from the predetermined value which is to be maintained, the sense of the net effective ampere turns of windings 44 and 46 varies accordingly to control the flux in the central leg of the core member 42.

As illustrated, the direct-current control winding 48 of the amplifier 32 is a load compensating control winding being connected in series with the load conductor 12. The control winding 48 is so proportioned that it compensates for the impedance and inductive drop in the circuit of the rectifier 24 and filter circuit and is so disposed on the central leg of the core member 42 that for an increase in load, an increase in the voltage across the primary winding 18 of transformer 20 results.

The load compensating control winding 48 may be connected in series with load conductor 12 either before or after the connection point at which the control windings 44 and 46 are connected across the load conductors 10 and 12. For this purpose, the switch 60 is disposed to be actuated to selectively engage contact member 64 or 62. Preferably, such positioning of the switch 60 is accomplished prior to energizing the circuit. When the switch 60 engages contact member 64, the load compensating winding 48 is connected in the load conductor 12 ahead of the connection of the windings 44 and 46 across load conductors 10 and 12 whereby the control winding 48 senses the change in the current flowing in control windings 44 and 46. However, if hunting occurs by reason of such changes in current in the windings 44 and 46, then it is desirable to position the switch 60 to engage contact member 62 which is connected by conductor 70 to a point or terminal 72 ahead of the connection of the control winding 48. Under such circumstances, this before-mentioned hunting in the load compensating control winding 48 is overcome and the winding 48 no longer tends to compensate for the drop in the circuit caused by the current in the parallel-connected control windings 44 and 46.

Figure 2:
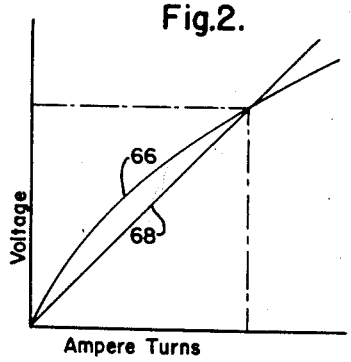
Fig. 2 is a graph, the curves of which illustrate the intersecting ampere turn characteristics of certain of the control windings utilized in the circuit of Fig. 1.

In operation, assuming that the circuit is connected as illustrated and that the potentiometer resistor 58 is adjusted to provide the intersecting characteristics as illustrated in Fig. 2 for the impedances 52 and 54 for a given or predetermined value of voltage across load conductors 10 and 12, then the net effective energization of the opposed control windings 44 and 46 is zero at the predetermined value of load voltage and the flux due to the alternating-current windings 34 and 36 may be considered as the only flux in the core member 42. In practice, the potentiometer resistor 58 is adjusted to maintain a net effective zero energization of the opposed control windings 44 and 46 for a given load condition whereby the flux due to the alternating-current windings 34 and 36 in conjunction with the flux due to the load compensating control winding 48 under the given load condition is sufficient to cause a voltage to be impressed on the consumption circuit of the value which is to be maintained.

If for any reason the voltage across load conductors 10 and 12 should change, for example, decrease as by reason of an increase in the load (not shown) then the linear resistor 52 draws more current than the non-linear resistor 54 with the result that the ampere turns of control winding 44 predominate over the ampere turns of control winding 46. Under such conditions of operation the net effective ampere turns of the parallel-connected windings 44 and 46 are in a direction with respect to the central leg of the core member 42 to create a flux which acts cumulatively with the flux due to the alternating-current windings 34 and 36 and the load compensating control winding 48 to increase the total magnetization of the core member 42 and thereby effect an increase in the voltage applied to the load circuits 10 and 12 to return the voltage thereacross to the predetermined value which is to be maintained.

If on the other hand the load (not shown) is decreased with a resulting increase in the voltage across the load conductors 10 and 12, then the non-linear resistor 54 draws more current than the linear resistor 52 with the result that the ampere turns of control winding 46 predominate over the ampere turns of control winding 44. The net effective ampere turns of the parallel-connected control windings 44 and 46 are thus in a direction to create a flux which opposes the flux due to alternating-current windings 34 and 36 and the load compensating control winding 48 to reduce the total average flux of the core member 42 of the amplifier 32 and thereby reduce the magnetization of the core member 42 and effect a reduction in the voltage applied to the load circuit to return the voltage thereof to the predetermined value which is to be maintained.

It is, of course, to be understood that during either of the operations just described that the ampere turns of the load compensating control winding 48 vary in accordance with the change in or a measure of the load current to cooperate with the control windings 44 and 46 as indicated in controlling the magnetization of the core member 42 to compensate for the drops in the rectifier 24 and filter circuit as the load changes.

Figure 3:
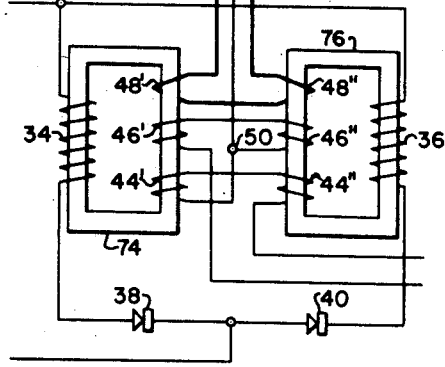
Fig. 3 is a diagrammatic view of a modification of a part of the system of Fig. 1.

Instead of the single core member 42 illustrated in Fig. 1, the magnetic amplifier 32 may be formed of two rectangular core members 74 and 76, as illustrated in Fig. 3, having the alternating-current windings 34 and 36, respectively, disposed thereon. In this embodiment the control windings 44, 46 and 48 of the amplifier of Fig. 1 are divided into two sets 44′, 46′ and 48′ and 44″, 46″ and 48″ being disposed on the core members 74 and 76, respectively, with the individual windings of the two sets so connected relative to the alternating-current windings that no supply frequency voltage appears at the terminals of the winding.

The functioning of the amplifier 32 of Fig. 3 is the same as that described for the amplifier of Fig. 1 in response to change in the voltage across conductors 10 and 12. However, the two core types of construction of the amplifier of Fig. 3 has the added advantage that a larger "gain" or amplification is possible because the air gap, necessarily present in a three-legged construction, can be eliminated in the rectangular core construction and oriented magnetic strip material can be used to full advantage in the rectangular cores.

As the systems described are formed of static elements, it is resistant to shock. While being sturdily constructed they are nevertheless quite sensitive. In practical applications it has been found to provide a regulation of 1% change in output for a 20% change in the input voltage and to regulate within 0.1% for a change ranging from no-load to full-load. The systems are constructed of standard component elements and can be readily reproduced by anyone skilled in the art.

We claim as our invention:

1. In a regulating system for maintaining an electrical quantity of a direct current load circuit substantially constant when supplied from an alternating current source of supply, the combination comprising, a rectifier having input and output terminals, the output terminals being connected to the load circuit, reactive means comprising reactor windings, connections forming two circuits connected in parallel circuit relation, each such circuit comprising at least one of said reactor windings and a rectifier connected together in series circuit relation, said rectifiers having such polarities that said two circuits are respectively conducting during opposite half cycles of the alternating current source of supply, circuit means for connecting said parallel connected circuits in circuit relation with the alternating current source of supply and with the input terminals of the rectifier so that the rectifier is responsive to the current flow through the reactor windings, a control winding connected to be energized in response to the load current so as to produce a flux that is additive to that flux produced by said reactor windings, two other control windings connected across the load circuit to provide ampere turns of opposite sense to one another for the reactive means, and impedance means connected in circuit relation with said two other control windings to control the sense of the net effective ampere turns thereof depending upon the direction of change of the electrical quantity from a predetermined value which is to be maintained.

2. In a regulating system for maintaining an electrical quantity of a direct current load circuit substantially constant when supplied from an alternating current source of supply, the combination comprising, a rectifier having input and output terminals, the output terminals being electrically connected to the load circuit, reactive means comprising a saturable magnetic core, two reactor windings on said core, connections forming two circuits connected in parallel circuit relation, each such circuit comprising one of said reactor windings and a rectifier connected together in series circuit relation, said rectifiers having such polarities that said two circuits are respectively conducting during opposite half cycles of the alternating current source of supply, circuit means for connecting said parallel connected circuits in circuit relation with the alternating current source of supply and with the input terminals of the rectifier so that the rectifier is responsive to the current flow through the reactor windings, a control winding connected to be energized in response to the load current so as to produce a flux in said core which is additive to that flux produced in said core by said reactor windings, two other control windings disposed on said core and connected across the load circuit to provide ampere turns of opposite sense for the reactive means, and impedance means connected in circuit relation with said two other control windings to control the sense of the net effective ampere turns thereof, depending upon the direction of change of the electrical quantity from a predetermined value which is to be maintained.

3. In a regulating system for maintaining an electrical quantity of a direct current load circuit substantially constant when supplied from an alternating current source of supply, the combination comprising, a rectifier having input and output terminals, the output terminals being connected to the direct current load circuit, reactive means comprising two saturable magnetic cores, a reactor winding on each of said cores, connections forming two circuits connected in parallel circuit relation, each such circuit comprising one of said reactor windings and a rectifier connected together in series circuit relation, said rectifiers having such polarities that said two circuits are respectively conducting during opposite half cycles of the alternating current source of supply, circuit means for connecting said parallel connected circuits in circuit relation with the alternating current source of supply and with the input terminals of the rectifier so that the rectifier is responsive to the current flow through said reactor windings, a control winding on each of said magnetic cores being connected to be energized in response to the load current so as to produce a flux in each of said magnetic cores that is additive to that flux produced by its associated reactor winding, two other control windings disposed on each of said magnetic cores and connected across the load circuit to provide ampere turns of opposite sense for each of the magnetic cores, and impedance means connected in circuit relation with said other control windings on each of said magnetic cores to control the sense of the net effective ampere turns thereof depending upon the direction of change of the electrical quantity from a predetermined value which is to be maintained.

4. In a regulating system for maintaining an electrical quantity of a direct current load circuit substantially constant when supplied from alternating current source of supply, the combination comprising, a rectifier having input and output terminals, the output terminals being connected to the load circuit, reactive means comprising two reactor windings, connections forming two circuits connected in parallel circuit relation, each such circuit comprising one of said reactor windings and a rectifier connected in series circuit relation, said rectifiers having such polarities that said two circuits are respectively conducting during opposite half cycles of the alternating current source of supply, circuit means for connecting said parallel connected circuits in circuit relation with the alternating current source of supply and with the input terminals of the rectifier so that the rectifier is responsive to the current flow through said reactor windings, a control winding for the reactive means, said control winding being connected to be energized in response to the load current so as to produce a flux that is additive to that flux produced by the reactor windings, two other control windings for the reactive means and connected across the load circuit to provide ampere turns of opposite sense for the reactive means, a linear resistance element connected in series circuit with one of said two other control windings and a non-linear resistance element connected in series circuit with the other of said two other control windings, the linear and non-linear resistance elements having intersecting impedance characteristics and cooperating to control the sense of the net effective ampere turns produced by said two other control windings depending upon direction of change of the electrical quantity from a predetermined value which is to be maintained.

5. In a regulating system for maintaining an electrical quantity of a direct current load circuit substantially constant when supplied from an alternating current source of supply, the combination comprising, a rectifier having input and output terminals, the output terminals being connected to the direct current load circuit, reactive means comprising reactor windings, connections forming two circuits connected in parallel circuit relation, each such circuit comprising one of said reactor windings and a rectifier connected together in series circuit relation, said rectifiers having such polarities that said two circuits are respectively conducting during opposite half cycles of the alternating current source of supply, circuit means for connecting the two parallel connected circuits in circuit relation with the alternating current source of supply and with the input terminals of the rectifier so that the rectifier is responsive to the current flow through the reactor windings, a control winding connected to be energized in response to the load current so as to produce a flux that is additive to that flux produced by the reactor windings, a pair of control windings connected across the load circuit to provide ampere turns of opposite sense for the reactive means, impedance means connected in circuit relation with the pair of control windings to control the sense of the net effective ampere turns thereof depending upon the direction of change of the electrical quantity from a predetermined value which is to be maintained, and adjustable resistance means connected in circuit relation between said impedance means and the load circuit for varying the magnitude of the voltage across the load circuit.

6. In a regulating system for maintaining an electrical quantity of a direct current load circuit substantially constant when supplied from an alternating current source of supply, the combination comprising, a rectifier having input and output terminals, the output terminals being connected to the direct current load circuit, reactive means comprising reactor windings, connections forming two circuits connected in parallel circuit relation, each said circuit comprising one of said reactor windings and a rectifier connected together in series circuit relation, said rectifiers having such polarities that said two circuits are respectively conducting during opposite half cycles of the alternating current source of supply, circuit means for connecting the two parallel connected circuits in circuit relation with the alternating current source of supply and with the input terminals of the rectifier so that the rectifier is responsive to the current flow through the reactor windings, a control winding connected to be energized in response to the load current so as to produce a flux that is additive to that flux produced by the reactor windings, a pair of control windings connected across the load circuit to provide ampere turns of opposite sense for the reactive means, impedance means connected in circuit relation with the pair of control windings to control the sense of the net effective ampere turns thereof depending upon the direction of change of the electrical quantity from a predetermined value which is to be maintained, adjustable resistance means connected in circuit relation between said impedance means and the load circuit for varying the magnitude of the voltage across the load circuit, and switch means connected in circuit relation between said adjustable resistance member and the load circuit for selectively connecting said control winding in the load circuit either ahead or behind the connection for the pair of control windings disposed across the load circuit.

JOHN L. WOLFF, Jr.
DONALD F. ALDRICH.

REFERENCES CITED

The following references are of record in the file of this patent:

UNITED STATES PATENTS

| Number | Name | Date |
| --- | --- | --- |
| 2,212,229 | Giroz | Aug. 20, 1940 |
| 2,306,998 | Claesson | Dec. 29, 1942 |
| 2,431,312 | Cronvall | Nov. 25, 1947 |
| 2,453,470 | Steinitz | Nov. 9, 1948 |
| 2,470,556 | Hedstrom et al. | May 17, 1949 |